(12) United States Patent
De Paepe et al.

(10) Patent No.: US 8,617,277 B2
(45) Date of Patent: Dec. 31, 2013

(54) PRESSURE REGULATION CONTROL ASSEMBLY; CRANKCASE VENTILATION FILTER ASSEMBLY INCLUDING PRESSURE REGULATION CONTROL ASSEMBLY; COMPONENTS; AND, METHODS

(75) Inventors: Thomas De Paepe, Nossegem (BE); Gert Willems, Wilsele (BE)

(73) Assignee: Donaldson Company, Inc., Minneapolis, MN (US)

(*) Notice: Subject to any disclaimer, the term of this patent is extended or adjusted under 35 U.S.C. 154(b) by 426 days.

(21) Appl. No.: 12/818,336

(22) Filed: Jun. 18, 2010

(65) Prior Publication Data
US 2011/0023425 A1 Feb. 3, 2011

Related U.S. Application Data

(60) Provisional application No. 61/270,408, filed on Jul. 7, 2009.

(51) Int. Cl.
*B01D 46/00* (2006.01)

(52) U.S. Cl.
USPC .......... 55/312; 137/843; 55/417; 55/420

(58) Field of Classification Search
USPC .......... 55/312; 123/572–574; 137/843
See application file for complete search history.

(56) References Cited

U.S. PATENT DOCUMENTS

| | | | | |
|---|---|---|---|---|
| 5,335,641 A * | 8/1994 | Schnabel | | 123/574 |
| 6,802,303 B2 * | 10/2004 | Håkansson | | 123/574 |
| 7,757,680 B2 * | 7/2010 | Park | | 123/572 |
| 2004/0035403 A1 * | 2/2004 | Pateman et al. | | 123/574 |
| 2005/0211232 A1 * | 9/2005 | Dushek et al. | | 123/574 |
| 2006/0059875 A1 * | 3/2006 | Malgorn et al. | | 55/468 |
| 2008/0035103 A1 * | 2/2008 | Barris et al. | | 123/198 E |
| 2008/0142091 A1 * | 6/2008 | Meinig et al. | | 137/488 |
| 2009/0139503 A1 * | 6/2009 | Park | | 123/573 |
| 2010/0101425 A1 * | 4/2010 | Herman et al. | | 96/400 |
| 2011/0017155 A1 * | 1/2011 | Jacob | | 123/41.86 |

FOREIGN PATENT DOCUMENTS

| | | | |
|---|---|---|---|
| DE | 20 2005 012 403 U1 | | 1/2007 |
| DE | 202005012403 | * | 2/2007 |
| EP | 0 556 826 A2 | | 8/1993 |
| EP | 1 933 009 A2 | | 6/2008 |
| EP | 1933009 | * | 6/2008 |
| WO | WO 2009/018454 A2 | | 2/2009 |

OTHER PUBLICATIONS

European Search Report mailed Sep. 30, 2010.

* cited by examiner

*Primary Examiner* — Duane Smith
*Assistant Examiner* — Sonji Turner
(74) *Attorney, Agent, or Firm* — Merchant & Gould P.C.

(57) ABSTRACT

A pressure control valve assembly, (i.e. pressure regulator valve assembly) is described which is configured for at least a two stage operation including: a first stage in which flow is allowed through two sections of the valve frame; and, a second stage in which the valve member is biased against one of the sections of the valve frame and not the second section. Specific example features and configurations are depicted and described. A crankcase ventilation filter assembly including the pressure control valve assembly is described.

20 Claims, 8 Drawing Sheets

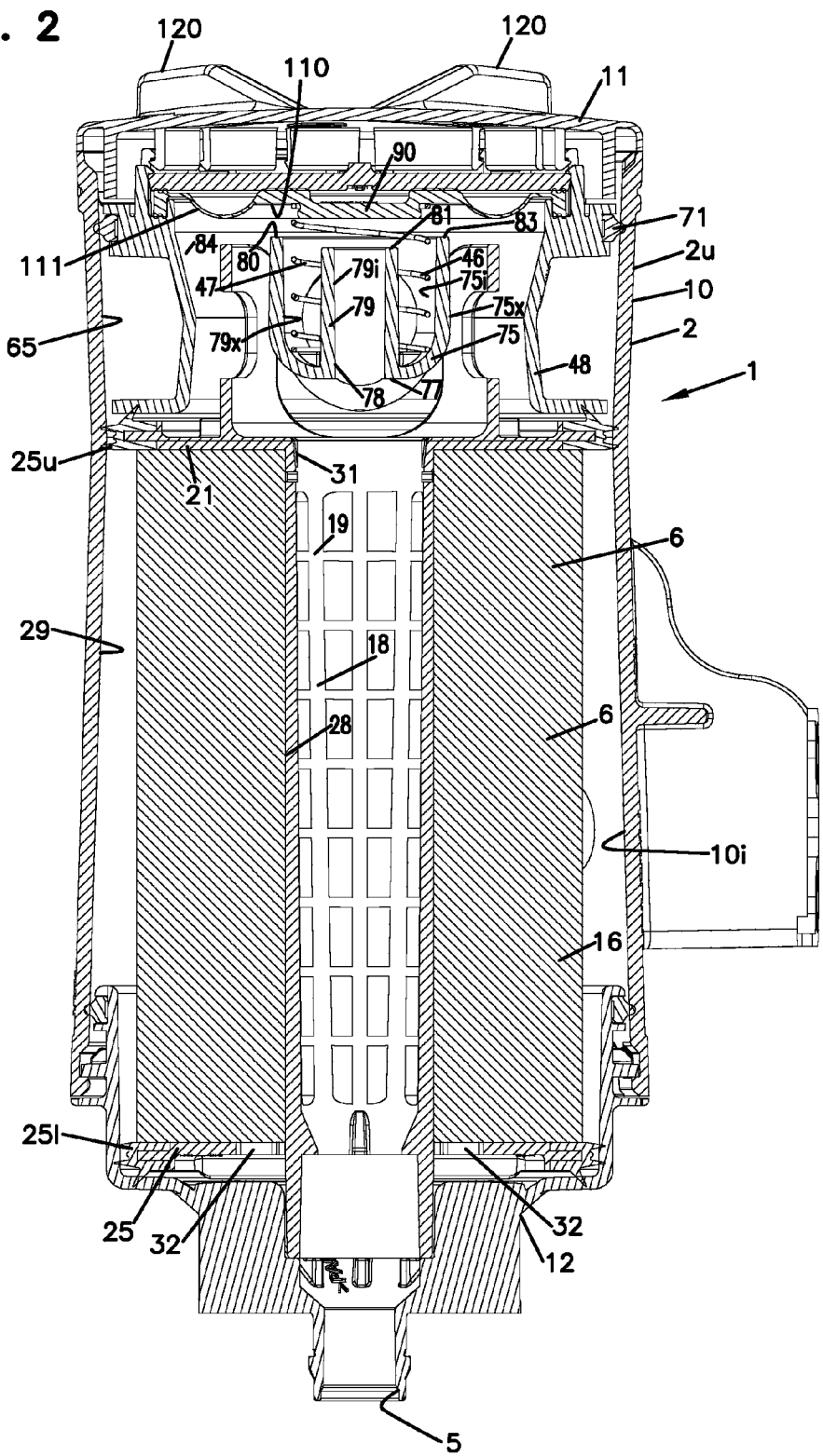

PRESSURE REGULATION CONTROL ASSEMBLY; CRANKCASE VENTILATION FILTER ASSEMBLY INCLUDING PRESSURE REGULATION CONTROL ASSEMBLY; COMPONENTS; AND, METHODS

CROSS-REFERENCE

The present application includes the disclosure of U.S. Provisional Application Ser. No. 61/270,408, filed Jul. 7, 2009; the complete disclosure of U.S. 61/270,408 being incorporated herein by reference.

A claim of priority is made to U.S. Provisional Application Ser. No. 61/270,408; to the extent appropriate.

FIELD OF THE DISCLOSURE

The disclosure particularly concerns a pressure regulator (or regulation) valve arrangement or assembly (i.e., a pressure control valve) usable in filter systems, and related methods. The pressure regulator valve assembly provides for preferred pressure control by using multiple stages or phases of operation.

In an example application, this disclosure relates to systems and methods for separating hydrophobic fluids (such as oils) which are entrained as an aerosol, from gas streams (for example, air streams). Further, arrangements provide for filtration of other contaminants such as carbon material, from the gas stream. The arrangements are typically used to filter crankcase ventilation gases from engine systems.

BACKGROUND

Gas streams, such as engine crankcase blow-by gases (i.e., crankcase ventilation gases from the crankcases of diesel engines) carry substantial amounts of entrained oils (liquid) therein, as aerosol. In some instances, many of the oil (liquid) droplets within the aerosol are within the size 0.1-5.0 microns ($\mu$). In addition, such gas streams also carry substantial amounts of fine particulate contaminants, such as carbon contaminants. Such contaminants often have an average particle size with the range of about 0.5-3.0 microns ($\mu$).

In some instances, it is desired to vent such gases back into an airflow inlet, for the engine system of concern. Such systems will generally be referred to herein as "closed," since the crankcase ventilation gases or engine blow-by gases are not vented to the atmosphere, but rather are retained within the system by being directed into the engine air intake for the system of concern. Typically, before such gases are directed to the engine intake, they are cleaned of a substantial portion of the aerosol and organic particulate contaminants therein.

An example such assembly is described in PCT/US 2008/071783 filed Jul. 31, 2008, and published on Feb. 5, 2009 as WO 2009/018454. Other assemblies are described in WO 2008/115985, published Sep. 25, 2008; and, WO 2008/157251, published Dec. 24, 2008.

Typically, such assemblies comprise a crankcase ventilation filter assembly having: a gas flow inlet; a gas flow outlet; and, a liquid drain outlet. Within the assembly a crankcase ventilation filter (or filter cartridge) is provided, through which the gases are directed in flowing from the gas flow inlet to the gas flow outlet. Within the filter or filter cartridge, liquid is coalesced and drained; the liquid being directed outwardly from the assembly through the liquid drain outlet. The filter or filter cartridge also removes a portion of the solid particulates within the gases. The filtered gases can then be vented or be directed through the gas flow outlet and to an airflow inlet for the equipment involved, for example into, or upstream from, an air cleaner.

In closed crankcase ventilation filter assemblies, sometimes a pressure regulator valve assembly is included within the crankcase ventilation filter assembly, or otherwise in association therewith. The function and operation of the pressure regulator valve assembly (i.e. pressure control valve) is to regulate the crankcase pressure to within acceptable limits in spite of varying pressure conditions at the crankcase ventilation filter assembly gas flow outlet. In particular, the regulator valve assembly prevents excessive negative pressure in the crankcase being caused by an underpressure condition at the gas flow outlet of the crankcase ventilation filter assembly being communicated back to the crankcase, i.e., through the crankcase ventilation filter assembly. A typical pressure control valve or pressure regulator valve assembly comprises a valve diaphragm biased against a spring, which closes or partially closes a gas stream through an outlet port of the crankcase ventilation filter system. For examples of such pressure regulation valve, see, for example, WO 2009/018454 and WO 2008/115985.

It is desired to improve pressure regulation with respect to crankcase ventilation filter systems.

This disclosure relates to an improved pressure regulation valve assembly usable, for example, with a crankcase ventilation filter assembly.

SUMMARY OF THE DISCLOSURE

According to an aspect of the present disclosure crankcase ventilation filter assemblies are provided which include a housing having a gas flow inlet arrangement, gas flow outlet arrangement and a liquid drain outlet arrangement. The housing defines an interior. A filter cartridge is removably positioned within the housing interior at a location for: filtering gases flowing from the gas flow inlet arrangement to the gas flow outlet arrangement; and, coalescing (at least a portion of) liquid entrained in the gases and draining it to the liquid drain outlet arrangement.

A pressure regulation valve assembly (pressure control valve or regulator valve) can be positioned within the housing interior. The pressure regulation valve assembly comprises a valve frame or valve frame arrangement defining a first gas flow conduit section and a second gas flow conduit section. The first gas flow conduit section defines a first end with a rim or valve seat. The second gas flow conduit section defines a first end adjacent to the first end of the first conduit section, and spaced therefrom.

Although alternatives are possible, typically, the first gas flow conduit section is isolated from, i.e., separate from, the second gas flow conduit section. By this it is meant that gases which enter the first conduit section can only enter the second conduit section, as those gases pass outwardly from first conduit section first end. Alternately stated, typically the first conduit section has two ends, one of which comprises the first conduit section first end; and, a wall of the first conduit section is impermeable, in extension between the two ends.

The valve assembly further includes a valve diaphragm positioned in the housing and oriented to move among: a first flow open, position (stage or phase) in which it is not seated against the first end of the first conduit section or the first end of the second conduit section; and a second flow, partially closed, position (stage or phase) in which the valve diaphragm is seated against the first end of the first conduit section (typically closing the first conduit section of gas flow therethrough) but is not seated against the first end of the second conduit section, thus leaving the second conduit section open with gas flow therethrough. Further, the valve diaphragm is configured and positioned to be biased toward and away from the first end of the second conduit section, regulating gas flow therethrough.

It is noted that in some extreme conditions, and in some embodiments, a third position can be possible for the valve diaphragm, in which the diaphragm closes both the first end of the first conduit section and the first end of the second conduit section. This is typically avoided, however, in preferred applications.

The valve arrangement generally includes a biasing member oriented to bias the valve diaphragm toward the first flow position until a pressure or flow condition draws the diaphragm toward the second flow position. The biasing member is typically configured to control movement of the valve member in a manner restricting gas flow through the valve assembly as it moves toward and away from the first and second gas flow conduit sections.

Also according to the present disclosure techniques are provided for assembling and using such crankcase ventilation filter assemblies. Further, componentry of such filter assemblies are described.

Also according to the present disclosure, a pressure regulation valve assembly is described that can be used with a variety of specific systems, to accomplish further flow regulation as described.

It is noted that the pressure regulation valve assembly can be used with a variety of types of filter systems including, for example, crankcase ventilation filter systems. Further, it is noted that the pressure regulator valve assembly can be configured to be positioned within a housing of a filter system during use, or exterior to that housing in use.

BRIEF DESCRIPTION OF THE DRAWINGS

FIG. 2 is a schematic cross-sectional view of the assembly of FIG. 1, taken at a right angle to the view of FIG. 1.

DETAILED DESCRIPTION

I. The Example Assembly of FIGS. 1-7

A. General Operation, FIG. 1

Figure 1:
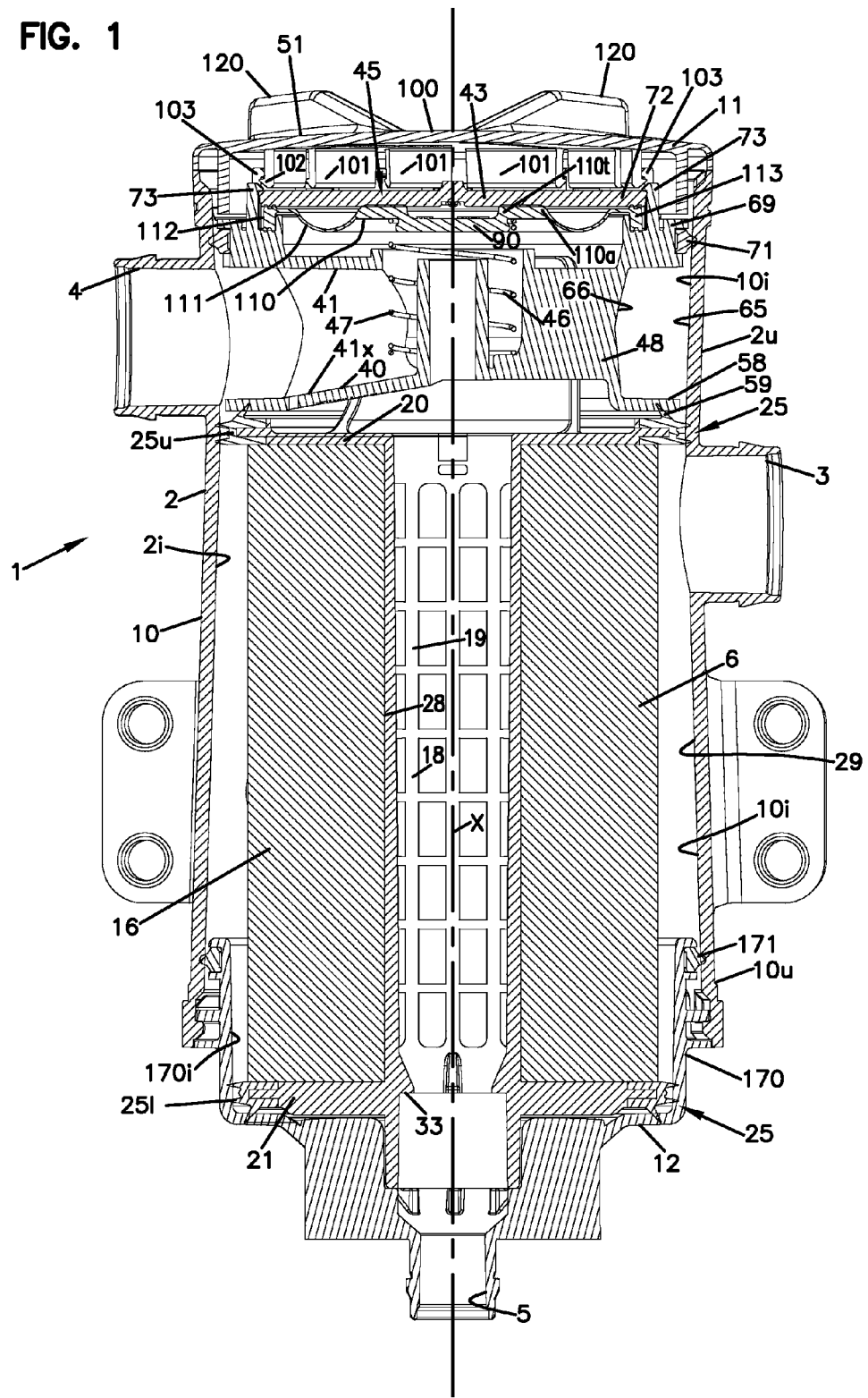
FIG. 1 is a schematic cross-sectional view of the crankcase ventilation filter assembly including a pressure control valve assembly (i.e., a pressure regulator valve assembly), according to the present disclosure.

Reference numeral 1, FIG. 1, generally discloses a crankcase ventilation filter assembly or arrangement according to the present disclosure. The crankcase ventilation filter assembly 1 includes a housing 2 having a gas flow inlet arrangement 3 and a gas flow outlet arrangement 4. The housing 2 further includes a (lower) liquid drain outlet arrangement 5.

In operation, crankcase gases, i.e., engine blow by gases, are directed into gas flow inlet arrangement 3. The gases contain, entrained therein, particulate contaminant and entrained liquid. Within an interior 2i of the housing 2, the gases are directed through a filter cartridge 6, as the gases pass (in normal flow) from the gas flow inlet arrangement 3 to the gas flow outlet arrangement 4. Within the filter cartridge 6, at least a portion of liquid entrained within the gases is coalesced and drained to the lower drain outlet arrangement 5 and outwardly from the housing 2. Within that same filter cartridge 6, particulate contaminant level is a reduced in the gases. The filtered gases are then directed outwardly from the outlet arrangement 4, typically to a combustion air intake system for the equipment of involved, for example to a location in, or upstream from, an engine air cleaner.

In typical assemblies, the housing 2 is openable for service access to the interiorly received filter cartridge 6. Referring to FIG. 1, the example housing 2 comprises a sidewall 10 having a top or cover assembly 11 second thereto. Although alternatives are possible, in the example assembly 1, the top or cover assembly 11 is separable from the sidewall 10, for service access to the interiorly received filter cartridge 6. By the term "service access" in this context, it is meant that separation of the cover assembly 11 from the housing 2 provides access for removal of cartridge 6, and/or installation of a new or refurbished cartridge 6.

Still referring to FIG. 1, housing 2 further includes a bottom cover 12, in this instance also separable from sidewall 10, although alternatives are possible. The bottom cover 12 includes liquid flow outlet 5. In some applications, the bottom cover 12 can be used to provide service access to interior 2i and cartridge 6.

Drain outlet 5 is typically attached to a liquid drain line, which directs collected liquid back into the engine or to a sump. Valve arrangements can be included within the drain line, for inhibiting liquid flow back into the assembly 1, when an under pressure condition within the assembly 1 occurs.

The cartridge 6 is typically a service part, which is periodically removed and either refurbished or replaced. The cartridge 6 typically comprises filter media 16 which can occlude, in use, thus warranting servicing. For the particular example cartridge 6 depicted, the media 16 is configured to surround and define open central interior 28.

Referring still to FIG. 1, the particular example cartridge 6 depicted comprises media 16, positioned on a support 18. The support 18 depicted comprises a porous center support core 19 and opposite end pieces 20, 21. For the particular example assembly 1 depicted, within the support 18, the support core 19 and end pieces 20, 21 are integral with one another, for example by being molded as a single support 18 from a plastic resistant to the environment of use such as nylon.

The cartridge 6 is typically configured to be releaseably sealed to appropriate portions of the housing 2 to inhibit gas flow from bypassing the media 16 in normal operation. The particular example cartridge 6 depicted includes a housing seal arrangement 25 comprising: an upper, annular, seal member 25u and a lower, annular, seal member 25l, each releaseably sealing to a surrounding portion of the housing 2. Alternate housing seal arrangements are possible.

In the particular, example, assembly 1 depicted, the upper, annular seal member 25i, which surrounds end piece 20, is positioned to engage the housing 2 and be sealed thereagainst, at a location between the inlet flow arrangement 3 and the outlet flow arrangement 4. Further, for the particular assembly 1 depicted, the lower annular seal member 25l is positioned on end piece 21 around the outside or perimeter thereof, oriented to seal against the housing 2 at a location between the gas flow inlet arrangement 3 and a liquid drain outlet arrangement 5.

The particular cartridge 6 depicted, and the assembly 1, FIG. 2, are configured for "out-to-in" flow during filtering, with respect to the media 16. By this it is meant that unfiltered gases are directed to annulus 29 around the media 10 and then, during filtering, through the media pack 16, to center 28. For the particular example assembly 1 depicted, the annulus 29 is a region defined between seals 25*u*, 25*l*.

In general then, during normal operation of the depicted example, assembly 1, gases are directed into gas flow inlet arrangement 3, from the crankcase, and are then directed to annulus 29. The gases are then passed through the media pack 16 into open central interior 28. Then the gases pass into porous core 19 and upwardly. The gases then pass outwardly from the cartridge 16, through central aperture 31 in end piece 20. These gases are eventually directed to gas flow outlet 4, from assembly 1. As discussed above, the gas flow (for normal operation) is typically then to an air intake system, as the assembly 1 will often be used as part of a closed crankcase ventilation (CCV) filter system.

Liquid coalesced within the media 16 will drain downwardly, eventually through outlet 5. With the particular cartridge 6 depicted, end piece 21 can be provided with a lower drain or bottom drain arrangement 32, FIG. 2, therein, by which at some coalesced liquid can drain directly downwardly from the media 16. However, referring to FIG. 1, any liquid which flows through the media 16 and into porous core 19 can flow directly downwardly therefrom through central outlet 33 in end piece 21, to housing outlet 5.

Referring to FIG. 1, in order to pass from interior 28 through aperture 31 and to gas flow outlet arrangement 4, the filtered gases must pass into interior 40 of outlet conduit 41. This requires the gases to pass adjacent a valve diaphragm 43 of a regulator valve assembly or pressure control valve 45. The pressure control valve or regulator valve assembly 45 comprises: valve diaphragm 43; biasing member 46, in this instance comprising coiled spring 47; and, valve frame or frame arrangement 48. As the gases pass into outlet conduit 41 and adjacent diaphragm 43, diaphragm 43 is drawn against the biasing member 46. As a vacuum or under pressure condition at outlet arrangement 4 increases, the biasing of valve diaphragm 43 against the biasing member 46 will increase, until the strength of the biasing member against compression is overcome and the biasing member 46 begins to compress. As this occurs, diaphragm 43 will deflect toward the valve frame 48; i.e., downwardly in the example depicted.

In general, in order to enter outlet conduit 41, the gases pass between the diaphragm 43 and an opening into the outlet conduit 41, discussed below. As the diaphragm 43 is deflected toward the outlet conduit 41, the size of the flow path for the gases is reduced. In this manner the regulator assembly 45 regulates flow adjacent to diaphragm 43, and inhibits the underpressure condition at outlet arrangement 4 from being transferred through the system 1 to outlet arrangement 4, and into the engine crankcase.

The particular regulator valve assembly 45 depicted, is configured to provide for at least two (2) stages or phases, during use. In the first stage or phase, the regulator valve assembly 45 is "open". By the term "open" in this context, it is meant that in this phase or stage, the diaphragm does not engage either a first conduit section or a second conduit section. In the first stage or phase, however, the valve diaphragm can adjust between "more open" and "less open" positions, in response to pressure conditions with the assembly 1. That is, the first phase or stage is not intended to be a single position of the valve diaphragm 43, nor is it intended to necessarily be a "most wide open" that the valve diaphragm 43 could possibly be.

In the second phase of stage, the valve diaphragm 43 is biased to engage (i.e., seat against) the first conduit section, typically to close a first flow path to gas flow therethrough, and to regulate gas flow through the second flow path. Although alternatives are possible, for the example assembly 1 depicted, in regulating the gas flow through the second flow path, the valve diaphragm 43 can, potentially, move to an extreme position in which the second flow path is completely closed. However this condition would be rare, if it even occurs at all, for assembly 1.

Mechanisms, assemblies and techniques for accomplishing the pressure regulator valve assembly operation, in an advantageous manner, are described herein below.

II. The 2-Stage Pressure Regulator Valve Assembly 45

Attention is directed again to FIG. 1. In FIG. 1, cartridge 6 is shown in underneath, and in engagement with, a cover assembly 11 comprising: cover piece 51; and, a regulator valve assembly 45. The valve assembly 45 comprises: valve diaphragm 43; biasing member 46; and, valve frame or frame arrangement 48. The valve frame or frame arrangement 48 defines, among other things, outlet conduit 41.

Still referring to FIG. 1, the valve frame 48 includes a lower (end) annular flange 58 which is configured to be engaged sealingly by upwardly directed seal flange 59 on cartridge 6, to provide a seal therebetween.

Valve frame 48 further includes an upper flange 69, having thereon an outer annular seal 71, positioned to sealingly engage an inner surface 10*i* of housing side wall 10, to provide a seal therebetween.

Above lower flange 58 and below upper flange 69 is provided outer, annular, gas flow region 65, surrounding and defined by central wall 66 of valve frame or frame arrangement 48. When installed in the overall assembly 1, FIG. 2, region 65 is defined around wall 66, between the valve frame 48 and an upper portion 2*u* of housing 2. Referring to FIG. 1 the gas flow outlet arrangement 4 is configured to communicate with region 65, so that the gases in region 65 can leave upper portion 2*u* of the housing 2, through outlet arrangement 4.

Region 65, then, is defined between: seal 71; seal 25*u*; seal 59; flanges 58, 69; and, between interior wall 66 and a portion 10*u* of wall 10 in upper region 2*u*.

Still referring to FIG. 1, in the example assembly 1, the top 51 is snap fit to frame member 48, as discussed below. Diaphragm 43 is secured in place underneath securing member 72, held in place under snap-fit projections 73 of valve frame member 48.

The outlet conduit 41, again, is defined by the frame member 48.

Attention is now directed in FIG. 2, with respect to the configuration of the outlet conduit 41. In particular, the outlet conduit 41 includes inner conduit section or portion 75, in the example depicted positioned above aperture 31 in end piece 20 of cartridge 6, when installed. Inner conduit portion 75 comprises a lower end 77, which is directed toward the cartridge 6. Lower end 77 includes a central aperture 78 therein, in gas flow communication with a first (central) conduit section 79; the first (central) conduit section 79 comprising a hollow cylindrical section extending, in the example, upwardly to a first, open, upper end 80 defined by rim 81. In the example depicted, the end 80, or rim 81, comprises a valve seat for a portion of the diaphragm 43, when the regulator valve assembly 45 is in the second stage or phase.

In the example assembly depicted, rim 81 is configured so that when engaged by the valve diaphragm 43, as discussed below, rim 81 is completely closed to passage of gas flow therethrough. Alternatives are possible.

Although alternative are possible, for the example assembly 1 depicted, the first (central) conduit section 79 is a solid continuous (i.e., nonporous) wall extending between ends 78, 80.

The inner conduit portion 75 of the outlet conduit 41, also defines gas flow aperture 83 which is open to gas flow between an interior 75i, of inner conduit portion 75, and a region 84 within housing 2 which is exterior to inner conduit portion 75 and, in general, exterior to conduit 41. Still referring to FIG. 2, gases, for example, which flow into aperture arrangement 83 and thus to interior 75i, but not into conduit section 79, can flow through outlet conduit 41, FIG. 1, to outlet arrangement 4. Further, again referring to FIG. 2, gases which flow upwardly through conduit section 79 can exit conduit 79 with flow over rim 81, and enter interior 75i of conduit inner portion 75 in a region or annulus 79x surrounding first conduit section 79. These gases can then flow through outlet conduit 41 to outlet arrangement 4, FIG. 1.

Figure 2A:
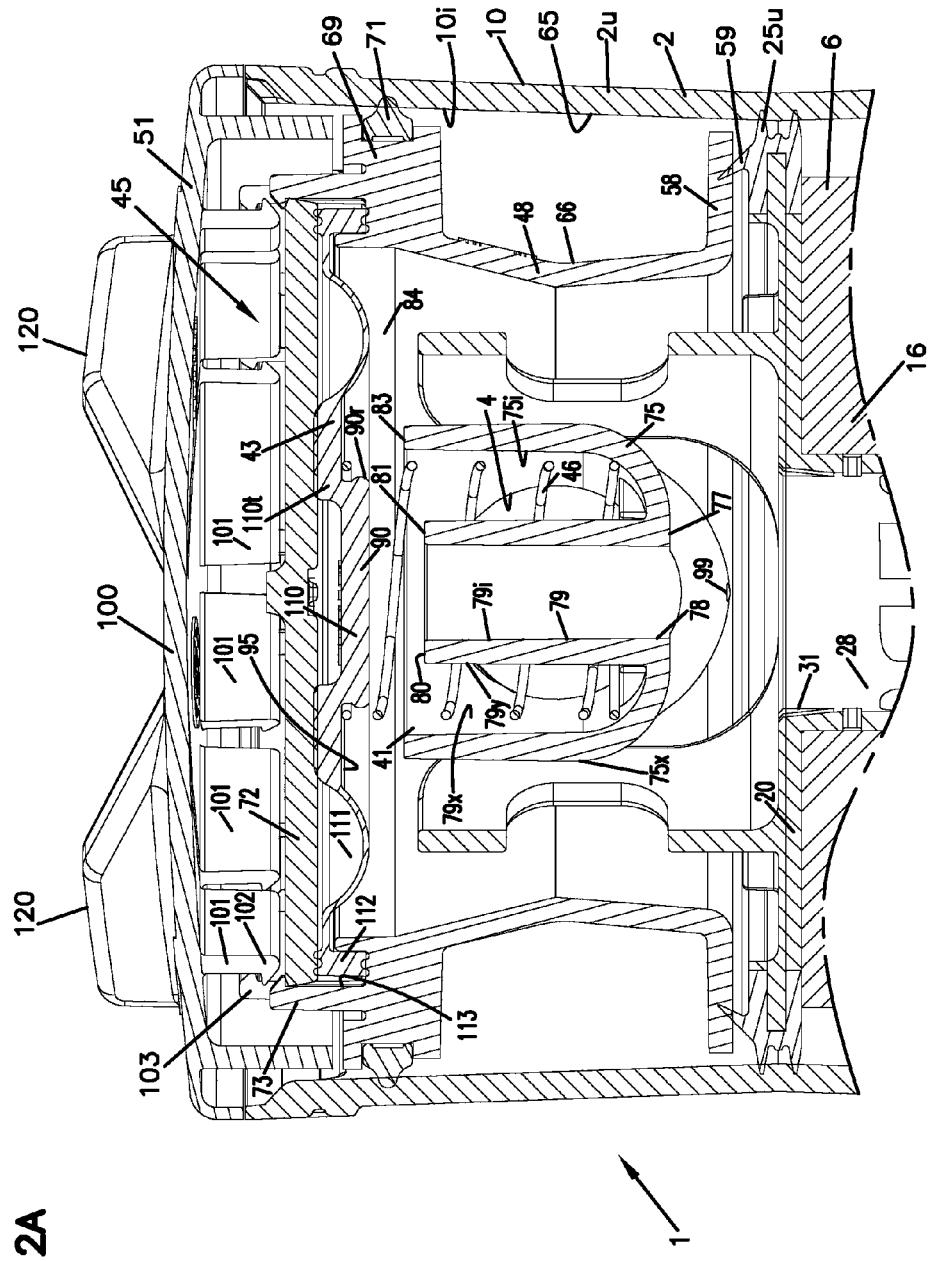
FIG. 2A is an enlarged schematic fragmentary view of a selected portion of FIG. 2.

It is noted that in FIG. 2A, a large fragmentary view of selected portions of FIG. 2 is depicted; the view being of portions related to the pressure regulator valve assembly 45 and the cover assembly 11, in general.

Referencing FIGS. 2 and 2A, in general terms, annulus 79x within interior 75i of conduit inner portion 75, but exterior to conduit section 79, can be characterized herein as a "second conduit section", having an open end 83, which is configured: to provide gas flow communication with a region exterior to outlet conduit 41; and, to provide gas flow communication with interior 79i of first conduit section 79, by flow over end 80.

It is generally the case that two gas flow conduit sections: first gas flow conduit section 79; and second gas flow conduit section 79x, are positioned within inner portion 75 of the outlet conduit 41, in a manner generally configured for normal gas flow therethrough, in somewhat opposite directions. By "normal" in this context, reference is meant to gas flow passing through assembly 2 from inlet arrangement 3 to outlet arrangement 4. This will be understood from a general characterization of the flows of assembly 1, FIG. 2, during normal operation.

Referring to FIGS. 2 and 2A, there are two paths by which gases, during normal flow, can flow into region 79x. Each of these paths is a flow path for gases from interior 28 of cartridge 6, i.e., filtered gases from cartridge 6. The first of these paths is upwardly through aperture 78 in first conduit section 79, over rim 81 and into region 79x. The second of these paths is around an exterior 75x of inner portion 75, over upper rim 83 and into region 79x.

In typical operation of the example assembly 1, FIG. 1, gases to be filtered are directed from inlet arrangement 3 into annulus 29. The gases pass through the media pack 16 of the cartridge 6 into open interior 28, FIG. 2. Referring now to FIG. 2A, the gases pass upwardly through aperture 31. The gases at this point flow through the two paths into region 79x. The first path, as described, is into aperture 78 and (upwardly) through first conduit section 79 and over rim 81. The second path, again, is around exterior surface 75x, over end 83 and into region 79x.

From region 79x, the gases pass through the remainder 41x, FIG. 1, of outlet conduit 41 and outwardly from housing 2 via gas flow outlet arrangement 4.

As underpressure at outlet arrangement 4 increased, valve diaphragm 43 will be biased against the biasing member 46, FIG. 1, with the valve diaphragm 43 eventually pulled downwardly. As the valve diaphragm 43 is pulled closer to inner conduit section 75, the size of the flow region between the valve diaphragm 43 and the conduit section 75 is decreased, regulating (restricting) flow. When the underpressure condition at outlet arrangement 4 is sufficient, center plug portion 90 of the diaphragm 43 will engage rim 81; center plug portion 90 being of smaller perimeter size than rim 83. Although alternatives are possible, typically rim 81 will be configured to serve as a valve seat, with central plug portion 90 substantially sealed thereagainst, inhibiting further gas flow over rim 81, from conduit section 79, and into region 79x. Thus, when this condition has been reached, one of the paths, i.e., the first path, of gas flow from aperture 31 through region 79x is blocked (in the example, completely closed).

Figure 3:
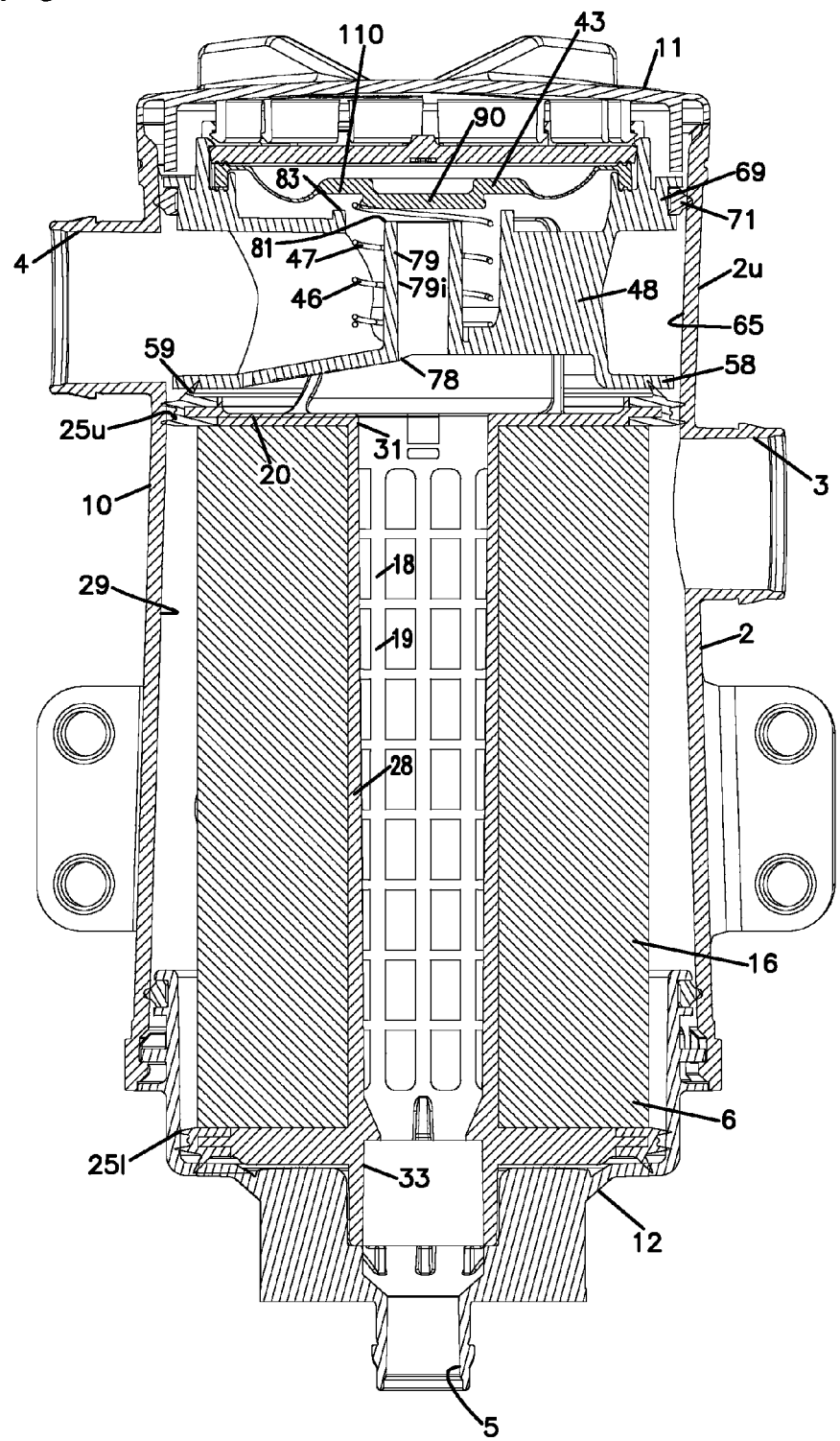
FIG. 3 is a schematic cross-sectional view of the assembly of FIG. 1, depicted with a diaphragm valve member of the assembly biased toward a more restrictive flow position.
Figure 4:
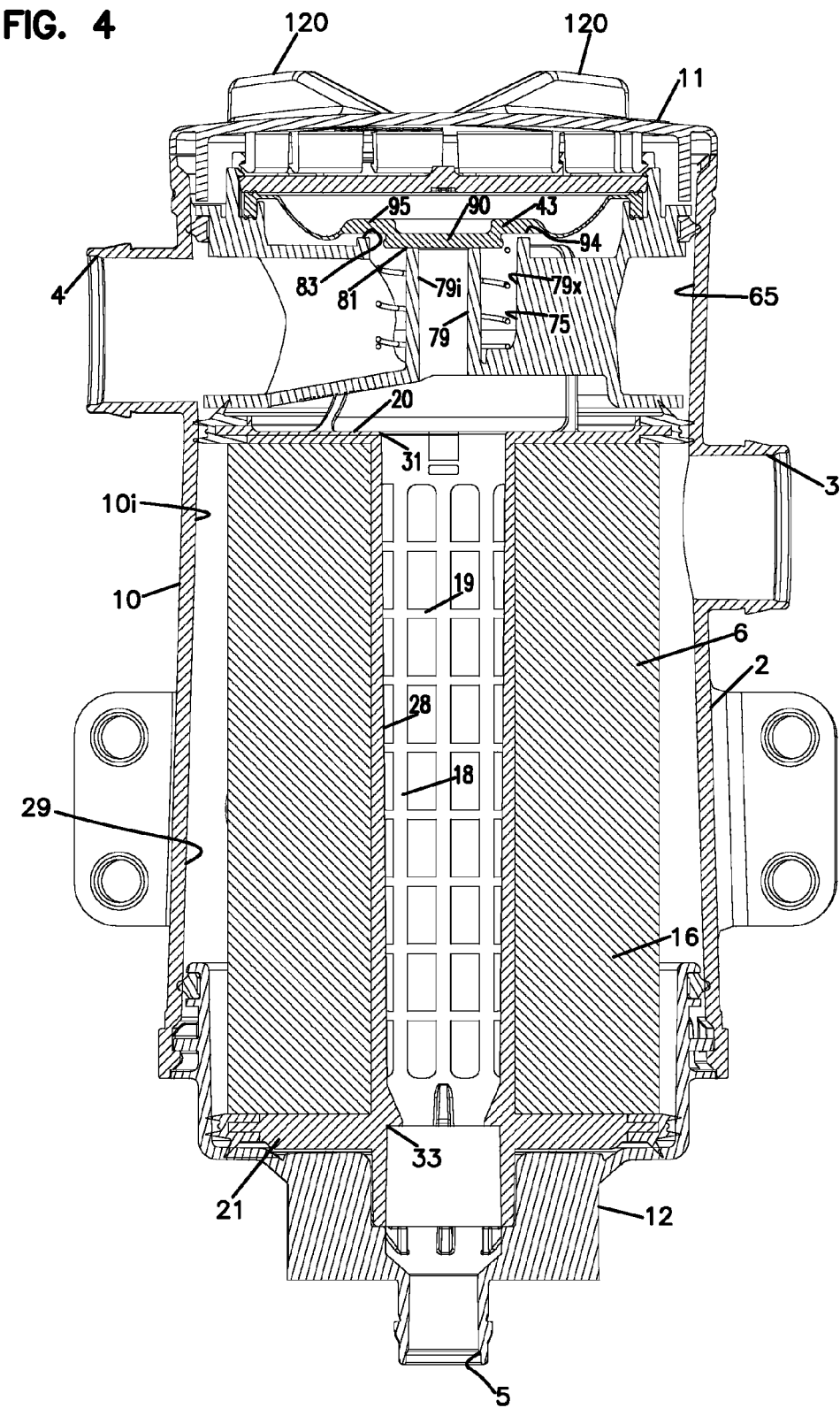
FIG. 4 is a schematic cross-sectional view analogous to FIGS. 1 and 3, but depicting the diaphragm valve member biased to a position closing a first end of a first conduit section therein to gas flow therethrough.

In FIG. 3, assembly 1 is depicted with the valve diaphragm 43 biased toward the first conduit section 79, but not in contact therewith. In FIG. 4, assembly 1 is depicted with the diaphragm 43 biased maximally toward first conduit section 79, and in sealing engagement therewith; the seal being provided between central plug portion 90 and rim 81.

By reference to FIG. 4, it will be understood that a gas flow path 94 remains open, between portion 95 of diaphragm 43 and end 83 of second conduit section 79x. Thus, gases can still flow into interior 79x of inner conduit section 75, by flowing around an outside 75x of interior section 75, FIG. 2. In general terms used herein, in FIG. 4 the assembly 1 is depicted configured for operation in the "second stage" or "second phase" of operation. It is noted that at an extreme (when the underpressure condition at the outlet arrangement 4 is sufficient), the diaphragm 43 may (in some systems) be configured to distort sufficiently to reach the configuration of FIG. 5, in which portion 95 is biased against rim 83, sealing section 79x to passage of gas therein over rim 83 or from conduit 79, although this is not required nor preferred. It is noted that even in the extreme configuration of FIG. 5, in the example depicted (although alternatives are possible) gas flow to outlet 4 is not completely closed off, however. In particular, and referring to FIG. 5, outlet conduit 41 includes optional aperture 99 therein, located as a liquid drain should any oil reach outlet conduit 41. Aperture 99 will also serve as a bleed hole, for flow of gases from the cartridge 6 through outlet arrangement 4, even in the event complete closure to both of first conduit section 79 and second conduit section 79x.

Figure 5:
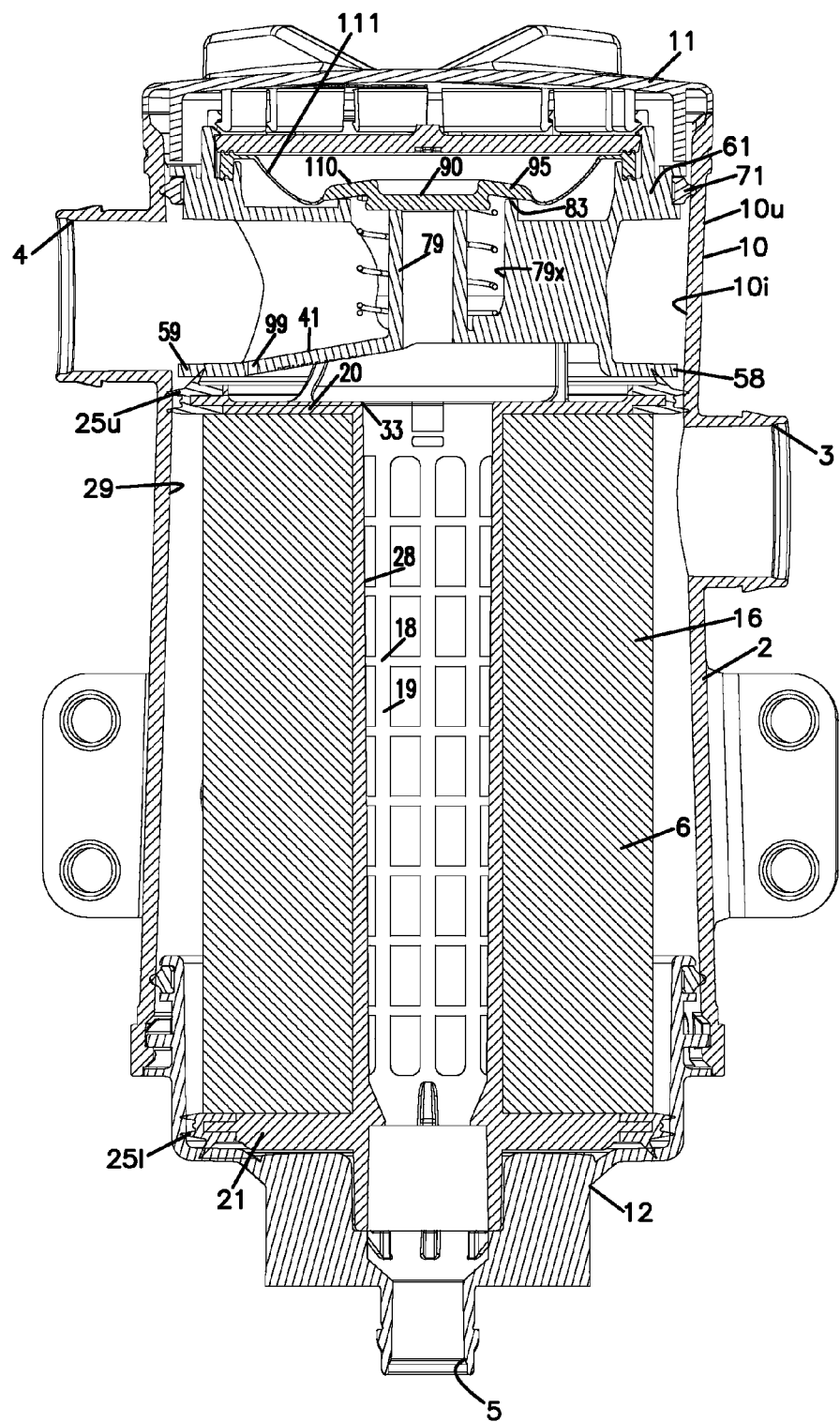
FIG. 5 is a schematic cross-sectional view the assembly of FIG. 1, depicting the diaphragm valve member biased to close a first end of a second conduit section, as well as a first end of the first conduit section.

It is anticipated that in a typical operation, the assembly 1 will rarely, if ever, be configured to reach the extreme position of FIG. 5, in which the valve diaphragm 43 is been biased sufficiently to completely close rim 83 to passage of gases thereover. Should the condition occur, it is expected that it would only last momentarily.

It is noted that the assembly 1 has been described as configured for an "out-to-in" flow through the cartridge 6, during filtering. By this term it is meant that normal flow from the gas flow inlet 3 to the gas flow outlet 4 passes through the cartridge 6 from outside-to-inside during filtering. The assembly 1 could alternately be configured and be used with an alternate gas flow path, i.e. "in-to-out". Used in this manner, filtering flow through the cartridge 6 would be a direction from inside-to-outside. In such a circumstance, normal gas flow through the regulator valve assembly 43 could be in the opposite direction. The general principles of operation of the valve assembly 43, however, would remain the same. This is discussed further below, in Section IV.

III. Other Features of Assembly 1

A. Features Relating to the Top or Cover Assembly 11.

Referring again to FIG. 1, it was previously noted that the housing 2 includes a top or cover assembly 11 which closes an upper end 2u the housing 2 during use. The top or cover assembly 11 can be removed from the housing 2u, for service access to interiorly received cartridge 6.

Referring to FIG. 1, the top or cover assembly 11 includes cap 100 having a plurality of flexible projections 101 depending therefrom. Flexible projections 101 each includes a hook portion 102 sized and positioned to engage, in snap fit engagement, an upwardly projecting hook member arrangement 103 on valve frame arrangement 48.

Still referring to FIG. 1, the valve member 43 comprises a central portion 110 surrounded by an annular rolling hinge portion 111. Rolling hinge portion 111 is surrounded by an annular rim 112. In general, the diaphragm 43 is secured in place by engagement of rim 112 in seat 113; diaphragm 43 being secured in place by retainer 72 being snap fit to valve frame arrangement 48.

The annular rolling hinge 111 is a relatively thin portion of valve diaphragm 43, and allows central region 110 to bias upwardly or downwardly, as operating condition necessitate. Typically, portion 111 has a thickness no greater than 20% of a thickness of central portion 110 in either: central plug portion 90, which is oriented to engage rim 80; or, annular portion 110a, which is positioned around region 90, and above rim 83. By "thickness" in this context, reference is meant to a cross-sectional comparative thickness between the regions 111, 90 and 110a in a direction generally parallel to the direction of movement of valve central region 110 during valve operation; i.e., in a direction generally parallel to a central axis, FIG. 1, of the example assembly 1.

Although alternatives are possible, it is noted that within central region 110, the valve member or diaphragm 43 does not have a thickness that is any less than about 80%, (typically no portion less than 100%) of the cross-sectional thickness of regions 90 and 110a. Indeed, for the particular example of diaphragm 43 depicted, the transition portion 110t between regions 110a and 90 results from region 110a slightly overlapping, above, region 90, and thus the thickness in the cross-sectional direction parallel to the direction of valve movement, in this region 110t, is approximately the thickness of region 110a plus the thickness of 110p. (With respect to this, a thickness of small rim area 90r, FIG. 2A, for providing a securing interaction with spring 47 is disregarded.)

Alternately stated, although alternatives are possible, typically central portion 110 is relatively thick, rigid, member, although it can deflect somewhat, as shown in FIGS. 4 and 5. Typically, it is constructed to resist substantial flexing, except, in some instances, under relatively extreme conditions.

Still referring to FIG. 1, cap 100 includes a plurality of projections 120, rejecting upwardly therefrom. The projections 120 provide for gripping and twisting of the cap 100, and thus the cover assembly 11, during assembly or servicing.

Figure 6:
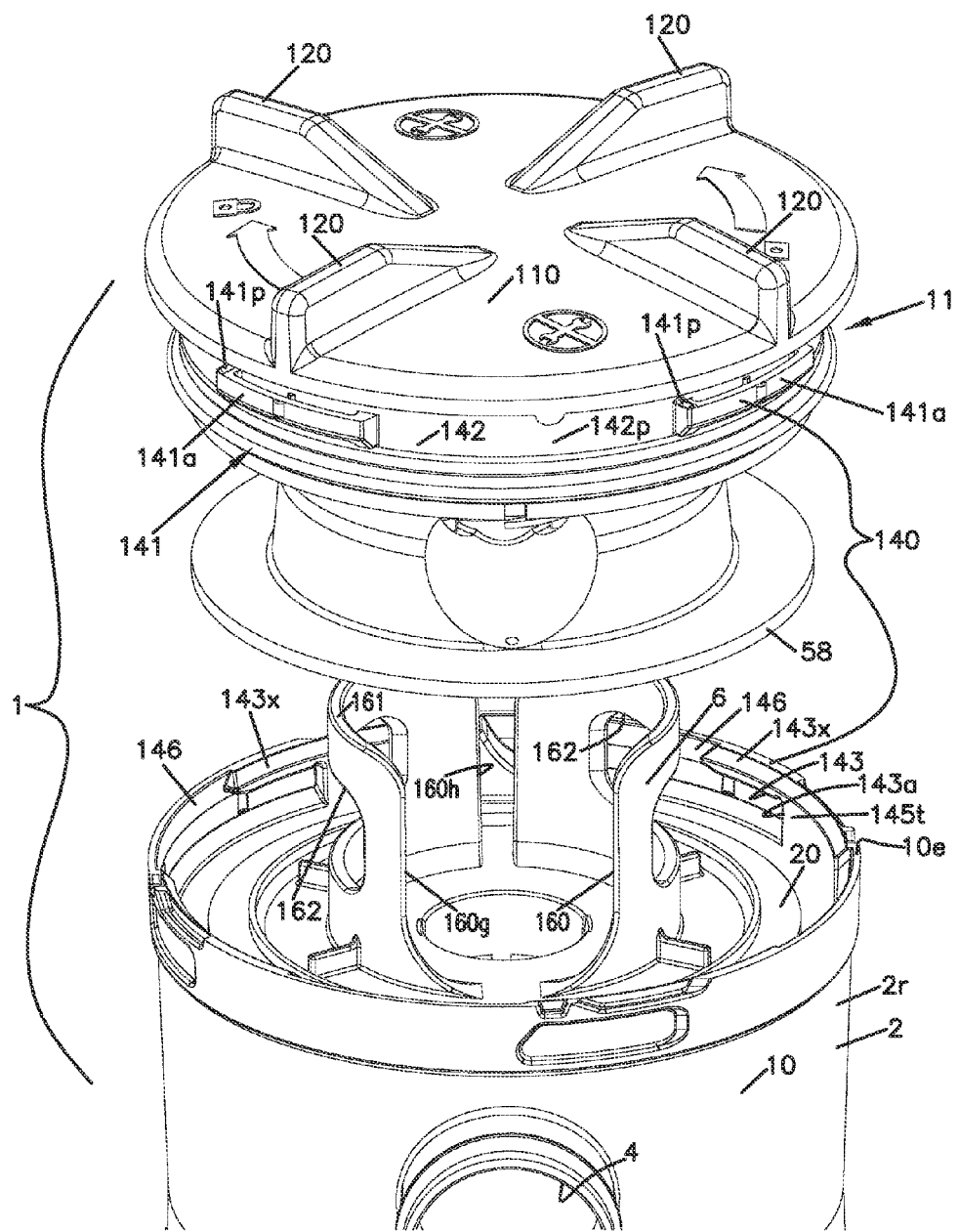
FIG. 6 is an enlarged, schematic, exploded, fragmentary perspective view of a top portion of the assembly of FIGS. 1-5.

With respect to this, attention is now directed to FIG. 6. FIG. 6 is an exploded, fragmentary, schematic, perspective view of an upper portion of assembly 1, showing cover assembly 11 removed from remainder 2r of housing 2, for assembly. (It is also noted that in FIG. 6, cartridge 6 is shown raised somewhat, relative to the remainder 2r of housing 2, as if being removed or inserted.) Referring to FIG. 6, the cover assembly 11 and housing sidewall 110 can be seen to include a twist lock connection arrangement 140 for securing the cover assembly 11 to the remainder 2r of the housing 2. A first member 141 of the twist lock closing arrangement 140 is provided on the cover assembly 11 and comprises a plurality of projections 141a positioned, radially spaced, around a perimeter 142p of a portion 142 of the cover assembly 11 that is received within an interior 2i of housing 2. The second member 143 of the twist lock closure arrangement 140 comprises a receiver arrangement comprising radially spaced receivers 143a positioned adjacent to an upper end 10e of side wall 10.

During assembly, cover assembly 11 is pushed downwardly relative to FIG. 6, with the projections 141a radially aligned to inner receiver areas 146. Then, with twisting, projections 141a are received within receivers 143a, and/or secured in place under retainers 143x. Receivers 143a can include an end tip 145t for engaging upward projection 141p on associated projections 141, providing for a "lock" or "friction fit" condition.

It is noted that as the cover assembly 11 is lowered, lower flange 58 is lowered until it engages the upwardly projection seal flange 59 on a cartridge 6, of FIG. 1. It is also noted that with respect to FIG. 6, cartridge 6 should be lowered within housing section 2r, for or during installation of cover assembly 11.

Still referring to FIG. 6, it is noted that the cartridge 6 includes, on end piece 20, an upwardly directed flange arrangement 160. The upwardly directed flange arrangement 160 defines an upper arcuate rim 161 with a flow aperture arrangement 162 thereunder. Flange arrangement 160 includes a first gap 160g therein, sized to fit around conduit section 41x, FIG. 1. It is noted that a second gap 160h is included in flange arrangement 160, opposite gap 160g.

From a review of FIG. 6, an understanding of service access to cartridge 6 is provided. In general, the cap 110 would be rotated by gripping flanges 120, to unlock the twist lock arrangement 140. Cover assembly 11 would then be disengaged from a remainder 2r of the housing. The cartridge 6 could then grasped, by grasping the flange arrangement 160, and may be removed from the housing 2. Then, a refurbished cartridge, or new cartridge can then be installed in the interior 2i, and the cover assembly 11 replaced.

It is noted that the cover assembly 11 can be positioned in a variety of rotational orientations, relative to the reminder 2r of the housing 2. It is not required that the flow conduit section 41x of FIG. 1, necessarily be directed toward the gas flow outlet arrangement 4. The particular assembly depicted in FIG. 6, provides for a total of four rotational orientations, each rotated 90 degrees from the next adjacent, although alternatives are possible.

B. The Bottom Cover Assembly

Attention is again directed to FIG. 1. As previously noted, bottom cover 12 is secured to side wall 10 at a lower end 10u thereof. The bottom cover 12 defines, among other things, liquid drain outlet arrangement 5.

Still referring to FIG. 1, the bottom cover 12 includes a side wall section 170. The side wall section 170 includes annular seal member 171 thereon, positioned to provide a releasable seal between side wall section 170 and inner surface 10i of side wall 10.

Further, interior surface 170i of section 170, provides a portion of the housing 2 which is engaged by lower seal 251 on cartridge 6.

Figure 7:
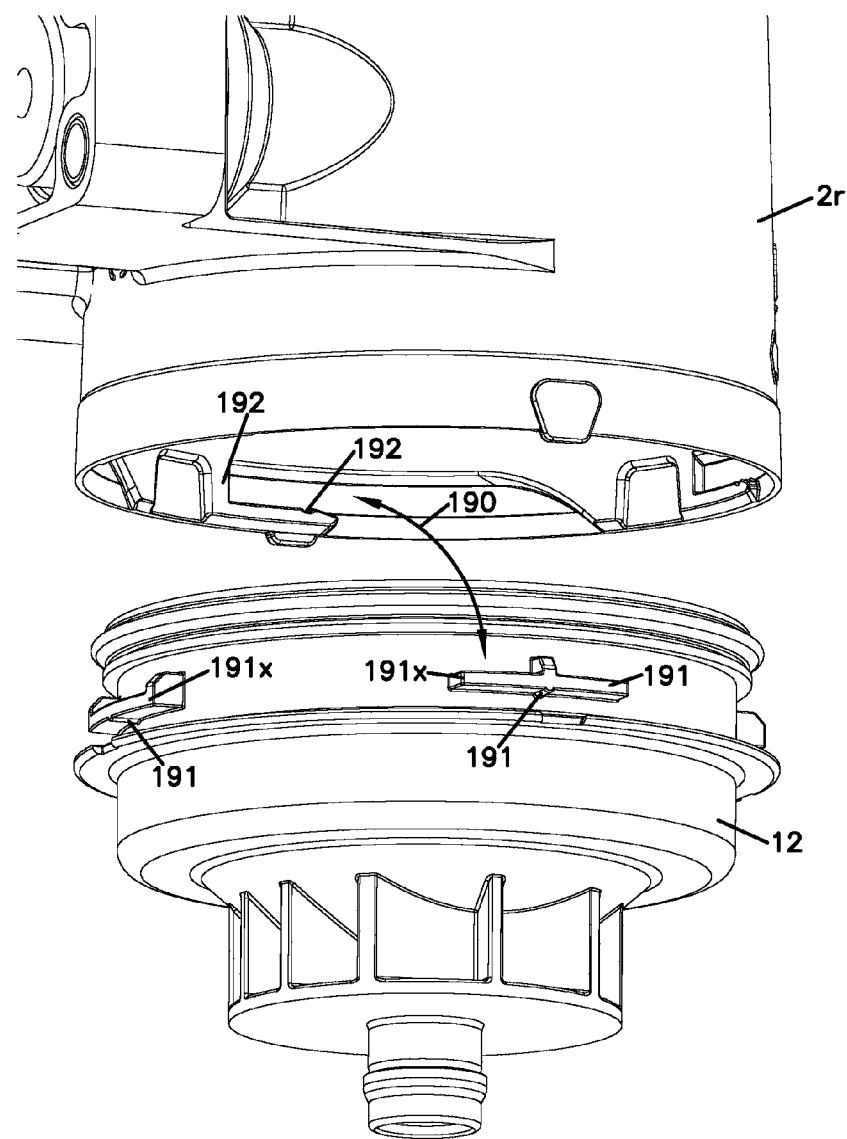
FIG. 7 is an enlarged, schematic, exploded, fragmentary view of a bottom portion of the assembly of FIGS. 1-5.

Attention is now directed to FIG. 7. In FIG. 7, bottom cover 12 is shown separated from remainder 2r of housing 2. The cover member 12 is depicted with a twist lock arrangement 190 for securing cover 12 to the side wall 10. The twist lock arrangement 190 comprises a projection arrangement 191 on the cover 12 receivable within a receiver arrangement 192 on the housing side wall 10. Thus, when the cover 12 is pushed in place and rotated, it is secured to the side wall 10. It is noted that the projection arrangement 191 comprises a series of spaced projections 191x, each having a rib 191r thereon sized to be received within receivers 192 on housing 10, to provide an interference fit.

It is noted that the assembly 1 can be configured so that the bottom cover 12 can also act as an access cover, a removable for servicing of cartridge 6 through the bottom of side wall 10. However, in some applications the bottom cover assembly 12 will be configured not to be removed for servicing. Further, on still other assemblies, the bottom cover 12 can be configured to not to even be removable from the remainder of assembly 2r.

C. Other Features

Attention is again directed to FIG. 1, it is noted that housing 10 is provided with a mounting arrangement 200, by which the assembly 10 can be secured to equipment for use.

In a variety of media types and materials can be used for media 16. Examples are described in WO 2009/018454 incorporated herein by reference. Alternatives, however, are possible. It is noted that the media can be pleated or it can be used in an unpleated form, unpleated being typical, for the features described.

The media 16 can be adhered to, i.e. potted to, the end pieces 20,21 if desired. However it is anticipated the typical application the media will be coil around supporting in a manner not involving potting the end pieces 20,21.

It is noted that a variety of additional alternatives with this specific features and techniques characterized herein can be practiced, in an assembly general accord with the principles for the present disclosure. It is also noted that an assembly, component or method need not practice all of the features characterized herein, in order to obtain some benefit according to the present disclosure.

IV. Alternate Flow Direction; Selected Alternate Features and Applications

As referenced above, the principles and techniques described herein can be applied as a crankcase filter assembly with an alternate flow to that depicted. In particular for example, it may be desired that the flow through the cartridge be from "inside-to-outside," during filtering. Reverse flow to that described above with respect to FIG. 1 could be used, and the valve arrangement 45 would operate analogously; a difference being that the regulator valve assembly 45 would be located between the inlet and the filter cartridge, rather than the between the filter cartridge and the outlet. Basic structural features for such an operation, of the regulator valve assembly 45 would remain generally the same. Another difference, of course, would be that the flow direction would be reversed with respect to passage through the first conduit section 79 and annulus 79x, FIG. 2.

It is noted that for a crankcase ventilation cover assembly 11, in accord with the principles herein, when applied in connection with a crankcase ventilation filter assembly configured for "in-to-out" flow through a cartridge and, with the media surrounding an open central volume, it is likely that the assembly would be modified with respect to general structural features from that depicted in the current figures, although the general structure of the regulator valve assembly 45 may be retained.

An example of a crankcase ventilation filter assembly configured for preferred operation with an "in-to-out" filtering flow direction with respect to flow through the media, is depicted for example WO 2008/115985 incorporated herein by reference. It can be seen from review of such an assembly, that typically that the cartridge will be provided with a closed bottom end cap with respect to the central open region the media pack; and, only one housing seal on the cartridge, typically located toward an upper end of the cartridge. It is noted, referring to the structure of WO 2008/115985, especially FIG. 16, that the regulator valve depicted that location, could be modified to include the features regulator valve assembly 45, FIG. 1.

It is noted that herein principles of the pressure regulator valve assembly described in association, during use, with a crankcase ventilation filter assembly. It is noted that the principles of the pressure regulator valve assembly can be applied in connection with alternate filter systems.

Further, it is noted that the examples described herein, a pressure regulator valve assembly is described and depicted positioned in an interior of a housing which also includes a filter cartridge. The principles can be applied in systems in which the pressure regulator valve assembly is exterior to the housing, but still within a gas flow line.

V. General Principles of Operation of the 2-Stage Valve Assembly

It is noted that a typical crankcase ventilation filter assembly, for example, depicted in WO 2009/018454, regulated by pressure regulator valve assembly as depicted therein, the range in crankcase pressure regulated is typically +/−3000 Pa. It is preferable to manage variations of the crankcase pressure +/−1500 Pa or lower. Especially at a low flow rate and high underpressure conditions at the crankcase ventilation filter assembly inlet, crankcase pressure tends to drop below −3000 Pa. At high bypass flows, in combination with high underpressure at that the crankcase ventilation filter assembly outlet, the pressure tends to be higher than +3000 Pa.

The standard configurations as described in WO 2009/018454, at high flow rates, the membrane can close off completely under higher pressure conditions. When this occurs, flow is suddenly stopped, and by consequence the pressure in the crankcase builds up rapidly until the force in the membrane is high enough to open the membrane again. Depending on the volume of the crankcase, this process repeats at different frequency range (although typically 10 Hz-100 Hz). By consequence, one can observe fluctuations of the pressure (up to 1500 Pa top-to-top) inside filter cartridge. This can cause vibration to the whole crankcase ventilation filter assembly and the connecting ducting or tubing. Moreover, it can have a negative impact on any check valve mounted in association with liquid drain arrangement from the crankcase ventilation filter assembly, resulting in improper function of the check valve.

In general, it is preferable to avoid complete closing of the assembly within the normal working range of the pressure control valve (i.e., the pressure regulator valve assembly). It is also preferable to avoid or modulate the fluctuations referenced.

It is noted that with configurations as depicted in WO 2009/018454, a bleed aperture is positioned in the outlet flow tube, above the cartridge. The bleed aperture, for example, provides for liquid drain, should any liquid reach the outlet flow tube. It also helps inhibit the problem of complete closing off of the valve. Typically the design such as depicted in WO 2009/018454, the maximum diameter of this bleed aperture is about 4.5 mm. For such an arrangement at lower flow rates (60 l/m) vibrations from the pressure control valve operation arm is generally managed. However under the higher flow conditions (for example 200 l/m) the pressure fluctuations remain.

With a pressure control valve (pressure regulation valve assembly) as generally described herein and depicted in the figures, better performance can be obtained. Typically, the assembly is "tuned" to obtain a desirable performance for the particular situation involved. This tuning would involve managing the following variables: distance from the valve annular region 110, FIG. 2A, to rim 83, referenced herein as D1; and by comparison, the distance from central plug 90 to the rim 81, referenced herein as D2. Typically, the distance D1 is at least 0.4 mm greater (and typically 0.6-1.0 mm greater) than D2. In an example system D1 equals 6 mm and D2 equals 5.2 mm.

Another variable vantage of the open cross-sectional area defined by rim 80, by comparison to the open area defined by rim 83. Typically, the total area surrounded by rim 81 is at least 3%, and not more than 20%, (usually 7-13%), of a total area surrounded by rim 83.

Another variable of interest is the size of annulus 79*x*, FIG. 2 in cross-sectional dimension by comparison to the cross-sectional dimension of tube 79. This can be obtained by subtracting from the cross-sectional area of rim 83, a cross-sectional area represented by outer surface 79*y* of conduit section 79, FIG. 2A, comparing it to the cross-sectional size the interior of conduit 79. In general, the first flow annulus around the first end 80 of the first conduit section 79, defined between rim 81 of the second conduit section 79*x* and the outer wall 79*y* of the first conduit section, has a cross-sectional flow area at least two (2) times of cross-sectional flow area defined by the rim 81 of the first conduit section 79, not more than eleven (11) times this area, typically, at least six (6) times the area, and typically not more than nine (9) times the area.

Other features will relate to the actual size of opening 81 and the size of an opening of rim 83. Typically opening 81 will, when circular, have a diameter on the order of 5 to 11 mm; and, the opening of rim 83, when circular, will have diameter on the order of 15 to 20 mm.

In general, for an example operation, the valve assembly can be configured so that over a first range of engine inlet pressure (for example 0 up to about −2000 Pa) the flow of gas is through both the first conduit section 79 and the second conduit section 79*x*. At higher engine inlet pressures, the valve diaphragm central plug portion 90 will engage and close the first conduit section 79, as depicted for example in FIG. 4. As the inlet pressure further drops, the secondary flow is regulated by the gap D1 minus D2. In this instance, the negative pressure of the engine is only acting on the surface defined by region 95 in FIG. 2A as opposed to the surface defined by plug 90 in region 95. The force on the diaphragm 90 is thus reduced and the diaphragm is inhibited from pressing sufficiently far to close off completely. In this manner, pressure is regulated at even higher flows without introducing excessive pressure fluctuations.

VI. General Comments and Observations

According to an aspect of the present disclosure a crankcase ventilation filter assembly is provided. The assembly generally includes a housing having a: gas flow inlet arrangement; a gas flow outlet arrangement; and, a liquid drain outlet arrangement. The housing defines an interior, in which is positioned a filter cartridge. The cartridge is typically a service part, removeably positioned within the housing interior at a location for: filtering gases flowing from the gas flow inlet arrangement to the gas flow outlet arrangement; and, coalescing liquid entrained in the gases and draining into the liquid drain outlet arrangement, i.e., coalescing at least a portion of such liquid. In this manner, the crankcase ventilation filter assembly is configured to receive crankcase ventilation gases (engine blow by gases) from an engine crankcase, and to filter those, with reduction of particulates and liquid entrained therein. In a closed crankcase ventilation filter system, gases leaving the gas flow outlet arrangement of the crankcase ventilation filter assembly can be directed to an inlet air intake for the equipment involved.

In general, a crankcase ventilation filter assembly in accord with principles described herein, includes a pressure regulation valve assembly positioned within the housing interior. The pressure regulation valve assembly, sometimes referenced as a pressure control valve, generally includes: valve frame; a valve diaphragm; and, biasing member. The valve frame defines a first gas flow conduit section and a second gas flow conduit section. The first gas flow conduit section defines a first end with a valve seat; and, the second gas flow conduit section defines a first end adjacent the first end of the first conduit section and spaced therefrom. In an example depicted, the gas flow conduit section is a generally vertically directed conduit, having opposite open ends; an upper end comprising the first end with the valve seat.

A valve diaphragm is positioned in the housing and oriented to move among: a first valve position in which it is not seated against either the first end of the first conduit section or the first end of the second conduit section; and, second partially closed position, in which the valve diaphragm is seated against the first end of the first conduit section (typically closing the first conduit section gas flow therethrough), while not being seated against the first end of the second conduit section and leaving the section conduit section open to gas flow therethrough and in which the valve diaphragm is biased toward the first end of the second conduit section, regulating gas flow therethrough.

The biasing member is oriented to bias the valve diaphragm toward the first flow position, until a portion of the gas flow outlet draws the diaphragm towards the second position.

In general, then, the pressure regulator valve assembly has two stages or phases of operation, providing for a preferred regulation of gases passing through the crankcase ventilation filter assembly, and thus a preferred regulation of pressure than the crankcase from which the gases are received. In particular, in the first stage or phase of operation, gas flow is regulated through two conduit sections, whereas in the second stage one of the conduit sections is engaged (typically closed) allowing for a more fine tuned regulation.

Although alternatives are possible, in an example arrangement depicted, the first end of the gas flow conduit section is surrounded by a portion of the second gas flow conduit section. Further, in an example depicted the first end of the first gas flow conduit section is circular; and, the portion of the second gas flow conduit section surrounding the first end of the first gas flow conduit section, and defining the first end of the second gas flow conduit section, is also circular.

In the example arrangement depicted herein, the first end of the first gas flow conduit section is a normal gas flow outlet end for the first gas flow conduit section. By this it is meant that during normal gas flow from the inlet arrangement to the outlet arrangement of the housing, gases will pass through the first gas flow conduit section, but directed therethrough in a direction such that the gases exit the first gas flow conduit section as they pass the first end of the first gas flow conduit section.

In an example arrangement depicted, the first end of the second gas flow conduit section is normal gas flow inlet end of the second gas flow conduit section. By this what is meant is that during normal operation, as gases flow from the inlet of the housing assembly to the outlet of the housing assembly and when they pass into the second gas flow conduit section, they pass into the first end of gas flow conduit section.

It is noted that a reverse flow pattern with respect to the normal gas flow for both the first end of the first gas flow conduit section and the second end of the second gas flow conduit section, is possible.

In an example arrangement depicted, the valve diaphragm has a central portion surrounded by rolling hinge ring section. The central portion includes a central plug sized to selectively engage the valve seat of the first conduit section without engaging the valve seat of the second gas flow conduit section; and, the central portion further includes an annular region surrounding the central plug sized to be biased toward the second end of the second gas flow conduit section.

Typically the diaphragm includes no portion between the central plug and the annular region at the central portion that is thinner, in cross-sectional dimension parallel the biasing direction, than a thickness of a central plug section in cross-section dimension parallel to the biasing direction. Herein the term "biasing direction" in this context, is meant to refer to a direction the diaphragm member biases, in use. The example depicted would comprise a central axis of the housing cartridge valve assembly.

In the example arrangement depicted, when at rest (i.e., not biased by flow), the valve diaphragm is positioned above the first conduit section and the second conduit section; and, the first end of the first conduit section is lower (recessed) than the first end of the second conduit section. Typically, when at rest, the first end of the first conduit section is at least 0.5 mm lower than the first end of the second conduit section, usually it is at least 1 mm lower. Typically it is no more than 3 mm lower and usually no more than 2.5 mm lower.

Typically, when the diaphragm is at rest, the first end of the first conduit section spaced is within a range from 4 to 6 mm, from a portion of the valve diaphragm directly thereabove, typically 4.5 to 5.5 mm; and, the first end of the second conduit section is spaced 5 to 7 mm, typically 5.5 to 6.7 mm from the diaphragm directly thereabove. Further, typically when the valve diaphragm is at rest, the distance of separation of the first end of the second conduit section from the valve diaphragm member thereabove, is at least 0.4 mm typically 0.6 to 1.0 mm and usually not more than 1.2 mm further than is distance of separation between the first end of the first conduit section and valve diaphragm directly thereabove.

Typically the biasing member comprises a coiled spring. In an example arrangement depicted, the coiled spring is positioned surrounding the first conduit section and surrounded by the first end of the second conduit section.

In an example arrangement depicted herein, the filter comprises media positioned around, and defining, an open central interior. An example is depicted in which the housing is configured for direction of normal gas flow from the gas flow inlet arrangement through the filter cartridge in a direction from outside-to-inside during filtering. Principles are described in which the housing can be operated with direction of normal gas flow from the gas flow inlet arrangement through the filter cartridge in a direction from inside-to-outside during filtering.

In an example assembly depicted herein, the pressure regulation valve assembly is positioned in a gas flow path between the filter cartridge and the gas flow outlet arrangement. Principles are described in which the pressure regulation valve assembly can be positioned in a gas flow path between the gas flow inlet arrangement and the filter cartridge.

An example assembly is described herein which the filter cartridge includes a central support with: a porous support core; and, first and second, opposite, end pieces; the media being positioned around the porous support core and between the first and second end pieces; and, the first end piece having a central gas flow aperture therein, in gas flow communication with the open central interior.

In an example assembly, the filter cartridge is operably positioned underneath the first and second gas flow conduit sections; and, the valve frame arrangement is configured such that when the valve diaphragm is positioned in the first flow position, gas flow from the filter cartridge can pass upwardly through the first gas flow conduit section, then over the first end of the first gas flow conduit section and into the second gas flow conduit section; and, gas flow from the filter cartridge can also pass around the outside of the second gas flow conduit section and then over the first end of the second gas flow conduit section and into the second gas flow conduit section. In an example depicted, when gases flow in this manner, gases exiting the first end of the first conduit section are flowing in an opposite direction from gases entering the second gas flow conduit section.

In an example assembly depicted, the first end of the first conduit section is circular and the first end of the second conduit section is circular.

In a typical assembly the first end of the first conduit section surrounds and defines a first conduit section flow and cross-sectional area that is at least 3%, and not more than 20%, of a cross-sectional end area surrounded by the first end of the second conduit section. Typically the first end of the first conduit section surrounds and defines a first conduit section flow in cross-sectional area there is at least 7% not more than 15% of a cross-sectional area surrounded by the first end of the second conduit section.

In an example arrangement described herein the first end of the second conduit section defines a first flow annulus around the first end of the first conduit section; the flow annulus having a cross-sectional flow area of at least two (2) times a cross-sectional flow area surrounded by the first end of the first conduit section, not more than eleven (11) times cross-sectional flow areas surrounded by the first end of the first conduit section. Typically, the flow annulus around the first end of the first conduit section has a cross-sectional flow area of at least six (6) times the flow area surrounded by the first conduit section and not more than nine (9) times this area.

An example assembly is depicted in which the housing includes a top cover that is removable from the remainder of the housing. The assembly is depicted so that when the top cover is removed, service access to an interior filter cartridge is provided.

An assembly is depicted in which the housing also includes a bottom cover that is removable from a remainder of the housing. The assembly can be configured so that when the bottom cover is removed, service access to an interiorly received filter cartridge is provided.

In an example crankcase ventilation filter assembly depicted, the valve frame arrangement defines: an upper annular flange; and, lower annular flange spaced from the upper annular flange. A flow annulus is defined between the two flanges, and between the valve frame and a wall of the housing. In an example depicted the upper annular flange has an outer seal member thereon, sealingly engaged to the housing.

In an example assembly depicted, the cartridge includes an upwardly directed seal flange; and, the lower annular flange of the valve frame arrangement is sealingly engaged by the upwardly directed seal flange on the lower annular flange, when the valve frame arrangement is sealingly engaged by the upwardly directed seal flange on the cartridge.

In an example depicted, the cartridge includes first and second end pieces with media positioned therebetween; the media surrounding and defining an open filter interior, the first end piece having an annular seal positioned to sealingly engage the housing at a location between the gas flow inlet arrangement and the gas flow outlet arrangement; and, the second end piece housing an annular seal positioned to sealingly engage the housing at a location between the gas flow inlet arrangement and the liquid drain outlet arrangement.

According another aspect of the present disclosure, a crankcase ventilation filter assembly is provided comprising a housing including: a gas flow inlet arrangement; a gas flow outlet arrangement; and, a liquid drain outlet arrangement. The housing defines an interior.

A filter cartridge is removably positioned within the housing interior location for: filtering gases flowing from the gas flow inlet arrangement to the gas flow outlet arrangement; and, coalescing liquid entrained in the gases and draining it to the liquid drain outlet arrangement.

A pressure regulation valve assembly is positioned within the housing. The valve assembly comprises a valve frame, a valve diaphragm, and a biasing member.

The valve frame defines a first gas flow conduit section having a first end with a valve seat and a second gas flow conduit section having a first end. A first end of the first gas flow conduit section is recessed from a first end of the second gas flow conduit section. By "recessed" in this context, it is meant that: the two ends defined do not sit in the same plane; but, rather, that first end of the first gas flow conduit section is spaced away from a plane defined by or at the first end of the gas flow conduit section. In addition, the term "recessed" is meant to indicate that the direction of spacing of the first end of the first gas flow conduit section from the plane defined by the first end of the second gas flow conduit section, is in a direction generally away from a location of the valve diaphragm. Typically, a first end of the first gas flow conduit section is recessed within the second conduit section.

The valve diaphragm is positioned to move at least between: an open position in which it is not seated against either the first end of the first gas flow conduit section or the first end of the second gas flow conduit section; and, a partially closed position in which the valve diaphragm is seated against the first end of the first gas flow conduit section and is spaced from the first end of the second gas flow conduit section.

The biasing member is positioned to control movement of the valve diaphragm. By "control" in this context, it is meant that the biasing member, typically a coiled spring, is positioned to engage the valve diaphragm and to resist movement along the positions defined, except in response to liquid gas flow or gas flow pressures.

It is noted that specific features of the arrangement may be as previously characterized. It is also noted that also according to the disclosure herein, a pressure control valve arrangement is provided, which includes selected features as previously defined. Further additional possible components and features are described in detail.

It is further noted that there is no requirement that a crankcase ventilation filter assembly, pressure control valve assembly or components thereof, or techniques involving such assemblies, include all of the features and techniques characterized herein, to obtain some advantage.

It is noted that according to the present disclosure, a pressure regulator control valve assembly is provided. The assembly can be used, for example, with a crankcase ventilation filter assembly, although it can be used with alternate filter arrangements also. Further, it can be adapted to be positioned within a housing of a filter system, as described herein, although it can alternatively be positioned exterior to a housing that includes a cartridge therein. The features of the crankcase ventilation filter assembly generally characterized herein, provide for two phases or stages of operation, as described.

We claim:

1. A crankcase ventilation filter assembly comprising:
   (a) a housing including: a gas flow inlet arrangement; a gas flow outlet arrangement; and, a liquid drain outlet arrangement;
      (i) the housing defining an interior;
   (b) a filter cartridge removably positioned within the housing interior at a location for: filtering gases flowing from the gas flow inlet arrangement to the gas flow outlet arrangement; and, coalescing liquid entrained in the gases and draining coalesced liquid to the liquid drain outlet arrangement;
   (c) a pressure regulation valve assembly positioned within the housing interior and comprising:
      (i) a valve frame defining a first gas flow conduit section and a second gas flow conduit section;
         (A) the first gas flow conduit section defining a first end with a valve seat;
         (B) the second gas flow conduit section defining a first end adjacent the first end of the first gas flow conduit section and spaced therefrom;
         (C) the first end of the first gas flow conduit section being a normal gas flow outlet end of the first gas flow conduit section; and,
         (D) the first end of the second gas flow conduit section being a normal gas flow inlet end of the second gas flow conduit section;
      (ii) a valve diaphragm positioned in the housing and oriented to move among:
         (A) a first flow position in which it is not seated against either the first end of the first gas flow conduit section or the first end of the second conduit gas flow section; and,
         (B) a second, partially closed, position: in which the valve diaphragm is seated against the first end of the first gas flow conduit section, while not being seated against the first end of the second gas flow conduit section and leaving the second gas flow conduit section open to gas flow therethrough; and, in which the valve diaphragm is biased toward the first end of the second gas flow conduit section, regulating gas flow therethrough; and
      (iii) a biasing member oriented to bias the valve diaphragm toward the first flow position until a pressure condition draws the valve diaphragm toward the second flow position.

2. A crankcase ventilation filter assembly according to claim 1 wherein:
   (a) the first end of the first gas flow conduit section is surrounded by a portion of the second gas flow conduit section.

3. A crankcase ventilation filter assembly according to claim 1 wherein:
   (a) the valve diaphragm has a central portion surrounded by a rolling hinge ring section:
      (i) the central portion including a central plug sized to selectively engage the valve seat of the first gas flow conduit section without engaging the valve seat of the second gas flow conduit section; and,
      (ii) the central portion including an annular region surrounding the central plug and sized to be biased toward the second end of the second gas flow conduit section;
      (iii) the valve diaphragm including no portion between the central plug and the annular region of the central portion that is thinner, in cross-sectional dimension parallel to a biasing direction, than a thickness of the central plug section in cross-sectional dimension parallel to the biasing direction.

4. A crankcase ventilation filter assembly according to claim 1 wherein:
(a) the valve diaphragm is positioned above the first gas flow conduit section and the second gas flow conduit section; and,
(b) the first end of the first gas flow conduit section is lower than the first end of the second gas flow conduit section.

5. A crankcase ventilation filter assembly according to claim 1 wherein:
(a) the biasing member comprises a single coiled spring surrounding the first gas flow conduit section and surrounded by the first end of the second gas flow conduit section.

6. A crankcase ventilation filter assembly according to claim 1 wherein:
(a) the filter cartridge comprises media positioned around an open central interior.

7. A crankcase ventilation filter assembly according to claim 1 wherein:
(a) the housing is configured for direction of normal gas flow from the gas flow inlet arrangement through the filter cartridge in a direction from outside-to-inside during filtering.

8. A crankcase ventilation filter assembly according to claim 1 wherein:
(a) the pressure regulation valve assembly is positioned in a gas flow path between the filter cartridge and the gas flow outlet arrangement.

9. A crankcase ventilation filter assembly according to claim 1 wherein:
(a) the filter cartridge includes a central support with: a porous support core; and, first and second, opposite, end pieces;
(i) media being positioned around the porous support core and between the first and second end pieces and defining an open central interior; and,
(ii) the first end piece having a central gas flow aperture therein, in gas flow communication with the open central interior.

10. A crankcase ventilation filter assembly according to claim 1 wherein:
(a) the filter cartridge is operably positioned underneath the first and second gas flow conduit sections; and,
(b) the valve frame arrangement is configured such that when the valve diaphragm is positioned in the first flow position:
(i) gas flow from the filter cartridge can pass upwardly through the first gas flow conduit section, then over the first end of the first gas flow conduit section and into the second conduit section; and,
(ii) gas flow from the filter cartridge can also pass around an outside of the second gas flow conduit section and then over the first end of the second gas flow conduit section and into the second gas flow conduit section.

11. A crankcase ventilation filter assembly according to claim 1 wherein:
(a) a first end of the first conduit section surrounds and defines a first gas flow conduit section flow end cross-sectional area that is at least 3% and not more than 20% of a cross-sectional end area surrounded by the first end of the second gas flow conduit section.

12. A crankcase ventilation filter assembly according to claim 1 wherein:
(a) the first end of the second gas flow conduit section defines a first a flow annulus around the first end of the first gas flow conduit section;
(i) the flow annulus around the first end of the first gas flow conduit section having a cross-sectional flow area of at least two (2) times a flow area surrounded by the first end of the first gas flow conduit section and not more than eleven (11) times the flow area surrounded by the first end of the first gas flow conduit section.

13. A crankcase ventilation filter assembly according to claim 1 wherein:
(a) the housing includes a top cover that is removable from a remainder of the housing, for service access to the filter cartridge.

14. A crankcase ventilation filter assembly according to claim 1 wherein:
(a) the housing includes a bottom cover that is removable from a remainder of the housing, for service access to the filter cartridge.

15. A crankcase ventilation filter assembly according to claim 1 wherein:
(a) the valve frame arrangement defines; an upper annular flange having an outer seal member thereon; and, a lower annular flange spaced from the upper annular flange to define a flow annulus therebetween;
(i) the outer seal member of the upper annular flange being sealed to the housing.

16. A crankcase ventilation filter assembly according to claim 15 wherein:
(a) the cartridge includes an upwardly directed seal flange; and,
(b) the lower annular flange of the valve frame arrangement is sealingly engaged by the upwardly directed seal flange of the cartridge.

17. A crankcase ventilation filter assembly according to claim 1 wherein:
(a) the cartridge includes first and second end pieces with media positioned therebetween;
(i) the media surrounding and defining an open filter interior;
(ii) the first end piece having an annular seal thereon positioned to sealingly engage the housing at a location between the gas flow inlet arrangement and the gas flow outlet arrangement; and
(iii) the second end piece having an annular seal thereon positioned to sealingly engage the housing at a location between the gas flow inlet arrangement and the liquid drain outlet arrangement.

18. A crankcase ventilation filter assembly according to claim 1 wherein:
(a) the filter cartridge comprises media positioned around an open central interior; and
(b) the housing is configured for normal gas flow from the gas flow inlet passing through the filter cartridge in a direction from inside-to-outside during filtering.

19. A crankcase ventilation filter assembly comprising:
(a) a housing including: a gas flow inlet arrangement; a gas flow outlet arrangement; and, a liquid drain outlet arrangement;
(i) the housing defining an interior;
(b) a filter cartridge removably positioned within the housing interior at a location for: filtering gases flowing from the gas flow inlet arrangement to the gas flow outlet arrangement; and, coalescing liquid entrained in the gases and draining it to the liquid drain outlet arrangement;
(c) a pressure regulation valve assembly positioned within the housing and comprising: a valve frame; a valve diaphragm; and a biasing member;
(i) the valve frame defining: a first gas flow conduit section defining a first end with a valve seat; and, a second gas flow conduit section defining a first end;

(A) the first end of the first gas flow conduit section being recessed from a first end of the second gas flow conduit section;
(B) the first end of the first gas flow conduit section being a normal gas flow outlet end of the first gas flow conduit section; and,
(C) the first end of the second gas flow conduit section being a normal gas flow inlet end of the second gas flow conduit section;

(ii) the valve diaphragm being positioned to move at least between: an open position in which it is not seated against either the first end of the first gas flow conduit section and the first end of the second gas flow conduit section; and, a partially closed position in which the valve diaphragm is seated against the first end of the first gas flow conduit section and is spaced from the first end of the second gas flow conduit section;

(iii) the biasing member being positioned to control movement of the valve diaphragm.

20. A pressure regulation valve assembly comprising:
(a) a valve frame; a valve diaphragm; and a biasing member;
(i) the valve frame defining: a first gas flow conduit section defining a first end with a valve seat; and, a second gas flow conduit section defining a first end;
  (A) the first end of the first gas flow conduit section being recessed from a first end of the second gas flow conduit section;
  (B) the first end of the first gas flow conduit section being a normal gas flow outlet end of the first gas flow conduit section; and,
  (C) the first end of the second gas flow conduit section being a normal gas flow inlet end of the second gas flow conduit section;
(ii) the valve diaphragm being positioned to move at least between: an open position in which it is not seated against either the first end of the first gas flow conduit section and the first end of the second gas flow conduit section; and, a partially closed position in which the valve diaphragm is seated against the first end of the first gas flow conduit section and is spaced from the first end of the second gas flow conduit section;
(iii) the biasing member being positioned to control movement of the valve diaphragm.

* * * * *